United States Patent [19]

Elonen

[11] 3,948,109

[45] Apr. 6, 1976

[54] VIBRATORY SCREENING APPARATUS

[75] Inventor: Kunto Elonen, Tampere, Finland

[73] Assignee: Rauma-Repola Oy, Tampere, Finland

[22] Filed: Dec. 23, 1974

[21] Appl. No.: 535,790

[30] Foreign Application Priority Data

Dec. 28, 1973 Finland .............................. 4010/73

[52] U.S. Cl. ...................................... 74/61; 209/367

[51] Int. Cl.$^2$ ...................... F16H 33/00; B07B 1/44

[58] Field of Search ......... 74/61; 198/220; 209/367, 209/326

[56] References Cited

UNITED STATES PATENTS

| | | | |
|---|---|---|---|
| 3,433,311 | 3/1969 | Lebelle | 74/61 X |
| 3,442,381 | 5/1969 | Johnson | 74/61 X |
| 3,473,396 | 10/1969 | Schwake | 74/61 |
| 3,583,497 | 6/1971 | Kossowski et al. | 74/61 X |

*Primary Examiner*—Leonard H. Gerin

*Attorney, Agent, or Firm*—Burns, Doane, Swecker & Mathis

[57] ABSTRACT

A vibratory structure of a screening apparatus has two shafts connected to rotate together by a toothed belt. Each shaft carries an eccentric weight which may be adjusted relative to the position of the shaft. The amplitude and frequency of the screening apparatus may be easily adjusted by adjustment of the weights and change of the transmission ratio between the two shafts.

3 Claims, 4 Drawing Figures

VIBRATORY SCREENING APPARATUS

This invention relates to a vibratory structure for a screening apparatus consisting of a vibratory structure with at least two shafts onto which eccentric weights are mounted, the transmission ratio and the direction of rotation of the shafts in relation to each other being adjustable and changeable.

The vibrating movement in vibratory screening apparatuses is usually produced by means of rotating shafts onto which eccentric weights are mounted. If the vibratory structure has one rotating eccentric shaft, a circular vibratory movement is produced. If two eccentric shafts are used, a linear, elliptical, star-shaped, or trefoil-shaped, etc. vibratory pattern can be produced besides the circular movement. The shape and the direction of the vibratory pattern can be changed nearly indefinitely by changing the direction of rotation of these two shafts in relation to each other, the number of revolutions of each shaft, that is their transmission ratio, the torque of each shaft, and the position of the eccentricity, that is the angle between the eccentrics. It is of course possible to use several shafts in one screening apparatus but usually two shafts are adequate.

Chains and gear wheels are generally used in the transmission between the shafts.

The object of this invention is to provide a vibratory structure for a screening apparatus in which it is easier, faster and simpler to change the transmission ratio, the eccentricity position, and the direction of rotation than in prior art apparatuses. A vibratory structure according to the invention is mainly characterized in that the transmission ratio and the synchronizing between the shafts is accomplished by means of one or several toothed belts arranged to run by or around belt pulleys mounted on the shafts, possibly by or around a separate drive wheel, and possibly by or around one or several auxiliary wheels.

Figure 1:
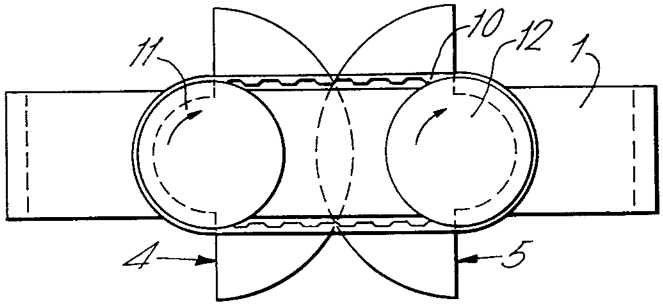
Figure 2:
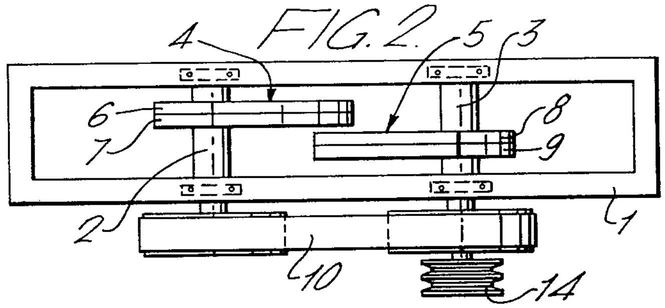
Figure 3:
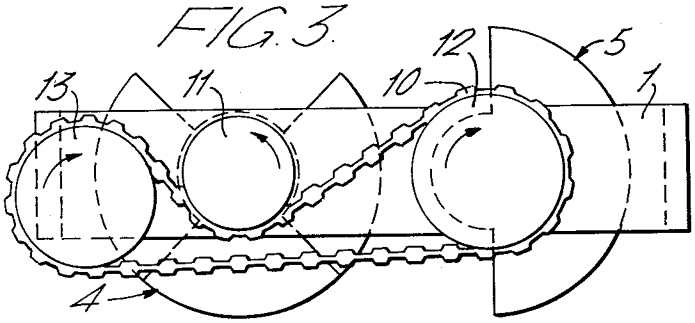
Figure 4:
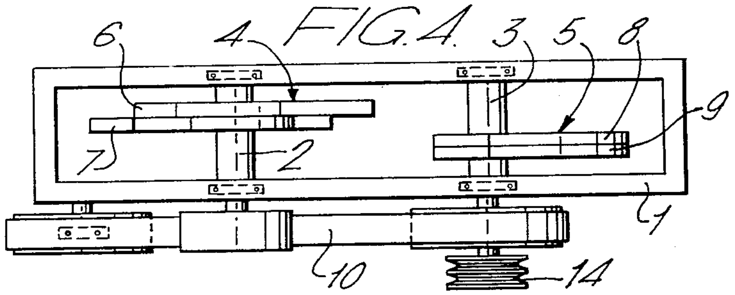

The invention is described in detail in the following with reference to the accompanying drawings in which:

FIG. 1 shows schematicaly a side view of a vibratory structure of a screening apparatus according to the invention, FIG. 2 shows a top view of the apparatus of FIG. 1, FIG. 3 shows a side view of a different embodiment of the invention, and FIG. 4 shows a top view of the apparatus of FIG. 3.

The vibratory structure consists of a frame 1, into which parallel vibratory shafts 2 and 3 are mounted at a certain distance from each other. Eccentric weights 4 and 5 are mounted on the shafts 2 and 3, the weights 4 and 5 each being formed by two eccentric weights 6, 7 and 8, 9, respectively, which are arranged on the shaft next to each other. The weights 6 and 7 can be turned on the shaft 2 in relation to each other, and correspondingly the weights 8 and 9 can be turned on the shaft 3 in relation to each other so that they are either on completely opposite sides of the shaft or completely on the same side of the shaft or in any position between the said extreme positions. Thus the total torque of the two eccentric weights can be infinitely adjusted between zero and the maximum.

In the vibratory structure of the invention, the synchronized connection and the transmission between the vibratory shafts 2 and 3 is accomplished by means of a toothed belt 10 provided with teeth either on one side so that the shafts 2 and 3 have the same direction of rotation, as in FIG. 1, or both sides so that the shafts 2 and 3 have opposite directions of rotation, as in FIG. 3. In the embodiment shown in FIGS. 1 and 2, the toothed belt 10 is arranged to run around belt pulleys 11 and 12 mounted on the shafts 2 and 3. The vibratory structure is driven for instance by means of an electric motor (not shown) so that the rotating movement is transmitted in this case by means of a belt transmission (also not shown) from a pulley 14 to the shaft 3. In the embodiment shown in FIGS. 3 and 4, the opposite direction of rotation of the shafts is accomplished by means of an auxiliary idler wheel 13, as shown in FIG. 3.

The toothed belt can run freely, shielded by a belt cover (not shown) and that is why it is easy to change the transmission ratio, the eccentricity position and the direction of rotation, in comparison to the prior art apparatuses provided with gear wheel and chain transmissions.

The changing of the eccentric torque is also relatively easy, as the eccentric weights 4 and 5 rotate also freely, inside the safety covers (also not shown).

According to experience, the shape, the direction, the frequency and the amplitude of vibration have a great influence on the properties and the effeciency of the screen (not shown), depending on the material to be screened and the size of the particles. The vibratory structure according to the invention provides a possibility to change and adjust the properties of the screen within wide limits, without dismantling the structure.

The invention is not, of course, restricted to the above embodiments. It can considerably vary in details within the scope of the claims.

I claim:

1. A vibratory structure of a screening apparatus comprising a frame; at least two shafts rotatably mounted in said frame; a pair of eccentric weights on each of said shafts, the weights of each pair being adjacent and angularly adjustable relative to each other on their respective shafts; drive pulleys on each of said shafts; drive means; and a belt connecting said drive means to said pulleys for synchronizing the rotation of said shafts.

2. A vibratory structure as in claim 1 wherein the belt is a toothed belt provided with teeth on one side only and only passes over said drive means and said drive pulleys, whereby said shafts rotate in the same direction.

3. A vibratory structure as in claim 1 wherein the belt is a toothed belt provided with teeth on both sides, the frame has an additional auxiliary rotatable idler shaft and a drive pulley on said auxiliary shaft, and said toothed belt passes over the drive means and said drive pulleys in a manner such that the eccentric-carrying shafts rotate in opposite directions.

* * * * *